(12) United States Patent
Hamazaki et al.

(10) Patent No.: US 7,625,138 B2
(45) Date of Patent: Dec. 1, 2009

(54) OPTICAL WAVEGUIDE HOLDING MEMBER AND OPTICAL TRANSCEIVER

(75) Inventors: Masahiro Hamazaki, Shinagawa (JP); Osamu Daikuhara, Shinagawa (JP); Yuko Ohse, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 5 days.

(21) Appl. No.: 12/071,177

(22) Filed: Feb. 15, 2008

(65) Prior Publication Data

US 2009/0016733 A1 Jan. 15, 2009

(30) Foreign Application Priority Data

Jul. 11, 2007 (JP) .............................. 2007-182315

(51) Int. Cl.
- G02B 6/36 (2006.01)
- G02B 6/26 (2006.01)
- G02B 6/42 (2006.01)

(52) U.S. Cl. ............................. 385/93; 385/14; 385/15; 385/31; 385/32; 385/33; 385/39; 385/49; 385/89; 385/92

(58) Field of Classification Search .................. 385/93, 385/14, 33, 49, 89
See application file for complete search history.

(56) References Cited

U.S. PATENT DOCUMENTS

| | | | |
|---|---|---|---|
| 5,631,988 A * | 5/1997 | Swirhun et al. ............... | 385/89 |
| 6,318,909 B1 * | 11/2001 | Giboney et al. ............... | 385/90 |
| 6,374,004 B1 * | 4/2002 | Han et al. ...................... | 385/14 |
| 6,404,960 B1 * | 6/2002 | Hibbs-Brenner et al. ...... | 385/52 |
| 6,522,798 B2 * | 2/2003 | Chiappetta et al. ............ | 385/14 |
| 6,533,471 B2 * | 3/2003 | Han et al. ...................... | 385/92 |
| 6,736,553 B1 * | 5/2004 | Stiehl et al. ................... | 385/89 |
| 6,901,185 B2 * | 5/2005 | Sasaki et al. .................. | 385/33 |
| 6,934,450 B2 * | 8/2005 | Hiramatsu .................... | 385/52 |
| 7,359,594 B2 * | 4/2008 | Nishizawa et al. ............ | 385/32 |
| 7,441,965 B2 * | 10/2008 | Furuno et al. ................. | 385/93 |
| 2007/0183724 A1 * | 8/2007 | Sato ............................. | 385/89 |

FOREIGN PATENT DOCUMENTS

JP 2001-51271 2/2001

* cited by examiner

Primary Examiner—Ryan Lepisto
(74) Attorney, Agent, or Firm—Staas & Halsey LLP

(57) ABSTRACT

An optical transceiver using an optical waveguide holding member is disclosed. The optical transceiver includes a printed circuit board and the optical waveguide holding member. Photoelectric conversion elements are formed in the printed circuit board. An optical waveguide including core members is formed in the optical waveguide holding member. The optical waveguide optically connects the photoelectric conversion elements to external optical fibers. An element side lens is formed at one end of the core member so as to face a light receiving and emitting section of the photoelectric conversion element. Flanges are formed on the corresponding side walls of the optical waveguide holding member. The fixed centers of the flanges and optical centers of the element side lenses are arrayed on the same straight line.

6 Claims, 6 Drawing Sheets

(a)

(b)

OPTICAL WAVEGUIDE HOLDING MEMBER AND OPTICAL TRANSCEIVER

BACKGROUND OF THE INVENTION

1. Field of the Invention

The present invention generally relates to an optical waveguide holding member to be mounted on a printed circuit board of an optical transceiver and the optical transceiver using the optical waveguide holding member. The optical transceiver receives an optical signal from an external device and converts the received optical signal into an electric signal, and transmits another optical signal to the external device by converting another electric signal into the other optical signal.

2. Description of the Related Art

Communications by using optical fibers have progressed with the development of a large capacity communication network at high speed operations and the development of advanced communication control devices. For example, in a communication terminal (personal computer and peripheral) in an office or a personal house, when signals are transmitted and received by connecting the communication terminal to a communication network such as the Internet, an optical fiber has been used between the communication terminal and the communication network. An optical transceiver receives an optical signal from an external device and converts the received optical signal into an electric signal, and transmits another optical signal to the external device by converting another electric signal into the other optical signal. The optical transceiver is used for connecting the communication terminal to the optical fiber by providing an optical waveguide formed between the external optical fibers and photoelectric conversion elements of the optical transceiver (refer to Patent Document 1).

[Patent Document 1] Japanese Laid-Open Patent Application No. 2001-051271

In the optical transceiver, an optical waveguide holding member for holding an optical waveguide is disposed on a printed circuit board on which the photoelectric conversion elements are mounted. Generally, the printed circuit board is formed of glass epoxy resin, and the optical waveguide holding member is formed of olefin based resin so as to have a function of cladding material. When the photoelectric conversion elements mounted on the printed circuit board are connected to the optical waveguide disposed on the optical waveguide holding member, light receiving and emitting sections of the photoelectric conversion elements face the corresponding ends of the optical waveguide, and optical centers of the light receiving and emitting sections are matched to corresponding optical centers of the ends. The positional accuracy between the optical centers must be ± a few μm.

The temperature of the optical transceiver rises to approximately 80 to 90° C. while the optical transceiver is used. The thermal expansion coefficients of the printed circuit board and the optical waveguide holding member are different. Consequently, due to a temperature change, the position where the optical waveguide holding member is connected to the printed circuit board may be shifted, and the optical centers of the light receiving and emitting sections of the photoelectric conversion elements and the optical centers of the ends of the optical waveguide may be shifted. When the optical centers are shifted by over some μm due to the thermal expansion difference in an environment where the temperature changes, the performance of the optical transceiver may be degraded.

SUMMARY OF THE INVENTION

The present invention may provide an optical waveguide holding member and an optical transceiver using the optical waveguide holding member in which a positional shift between optical centers of a printed circuit board side and an optical waveguide holding member side due to a temperature change is restricted.

According to one aspect of the present invention, there is provided an optical waveguide holding member. The optical waveguide holding member is mounted on a printed circuit board of an optical transceiver. The optical transceiver receives an optical signal from an external device and converts the received optical signal into an electric signal and transmits another optical signal to the external device by converting another electric signal into the other optical signal. The optical waveguide holding member holds an optical waveguide between external optical fibers and photoelectric conversion elements formed in or mounted on the printed circuit board. The optical waveguide holding member includes a pair of flanges which is used to mount the optical waveguide holding member on the printed circuit board, a first connecting section which optically connects first ends of the optical waveguide to corresponding light receiving and emitting sections of the photoelectric conversion elements, and a second connecting section which optically connects second ends of the optical waveguide to the external optical fibers. Optical centers of the first connecting section and fixed centers of the flanges are arrayed on a same straight line.

According to another aspect of the present invention, the photoelectric conversion elements are disposed in two blocks so that one of the blocks is used for receiving the optical signal and the other block is used for emitting the optical signal, and each of the blocks has plural photoelectric conversion elements for forming plural channels for the optical signals. The flanges are symmetrically disposed on corresponding side walls of the optical waveguide holding member viewed from the upper side of the optical waveguide holding member. The fixed centers of the flanges and the optical centers of the light receiving and emitting sections of the photoelectric conversion elements of the two blocks are arrayed on the same straight line at the first connecting section.

According to another aspect of the present invention, the light receiving and emitting sections of the photoelectric conversion elements of the two blocks are symmetrically formed in or mounted on the printed circuit board viewed from the upper side of the printed circuit board so that lenses at the first connecting section match the positions of the corresponding light receiving and emitting sections.

According to another aspect of the present invention, the optical waveguide holding member further includes notches in the side walls of the optical waveguide holding member. The flanges are disposed at the corresponding front sides of the side walls divided by the corresponding notches.

According to another aspect of the present invention, there is provided an optical transceiver which receives an optical signal from an external device and converts the received optical signal into an electric signal and transmits another optical signal to the external device by converting another electric signal into the other optical signal. The optical transceiver includes a printed circuit board, and a waveguide holding member mounted on the printed circuit board for holding an optical waveguide between external optical fibers and photoelectric conversion elements formed in or mounted on the printed circuit board. The optical waveguide holding member includes a pair of flanges which is used to mount the optical waveguide holding member on the printed circuit board, a first connecting section which optically connects first ends of the optical waveguide to corresponding light receiving and emitting sections of the photoelectric conversion elements, and a second connecting section which optically connects second ends of the optical waveguide to the corresponding external optical fibers. Optical centers of the first connecting section and fixed centers of the flanges are arrayed on a same straight line.

According to an embodiment of the present invention, since optical centers of a first connecting section and fixed centers of flanges are arrayed on the same straight line, an optical waveguide holding member and an optical transceiver using the optical waveguide holding member can be realized in which a positional shift between the optical centers of a printed circuit board side and an optical waveguide holding member side due to a temperature change is restricted.

Features and advantages of the present invention will be apparent from the following detailed description when read in conjunction with the accompanying drawings.

DESCRIPTION OF THE PREFERRED EMBODIMENT

Figure 1:
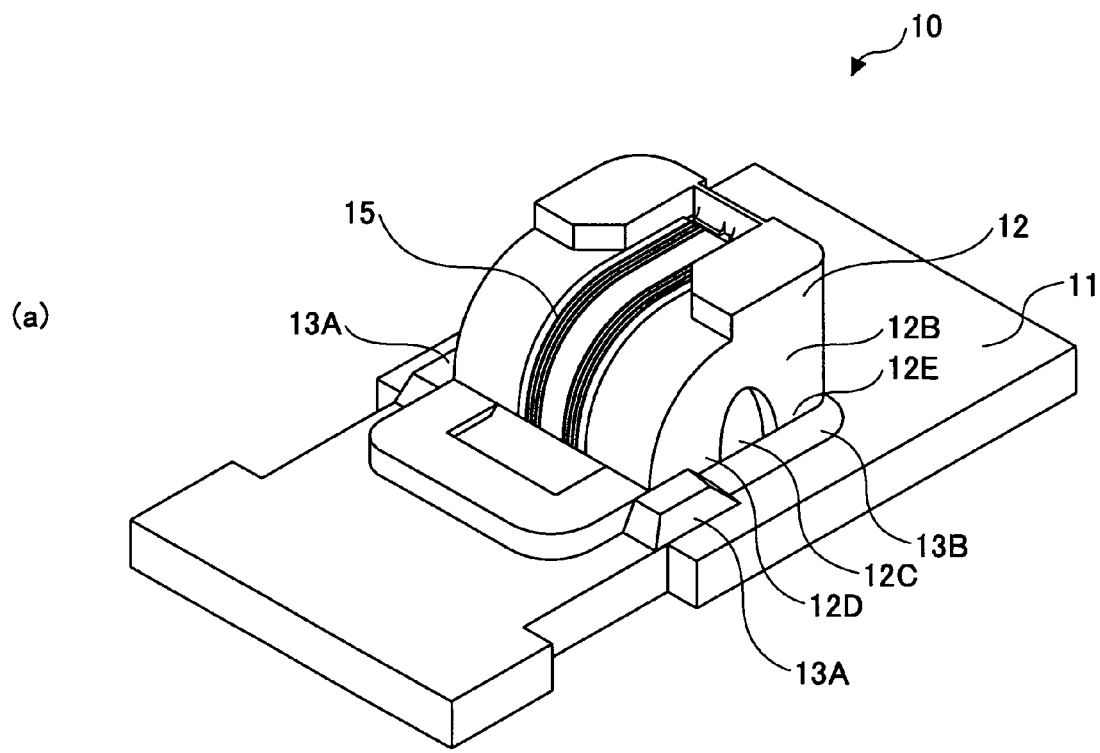
FIG. 1 is a perspective view of a part of an optical transceiver using an optical waveguide holding member according to an embodiment of the present invention.
Figure 1:
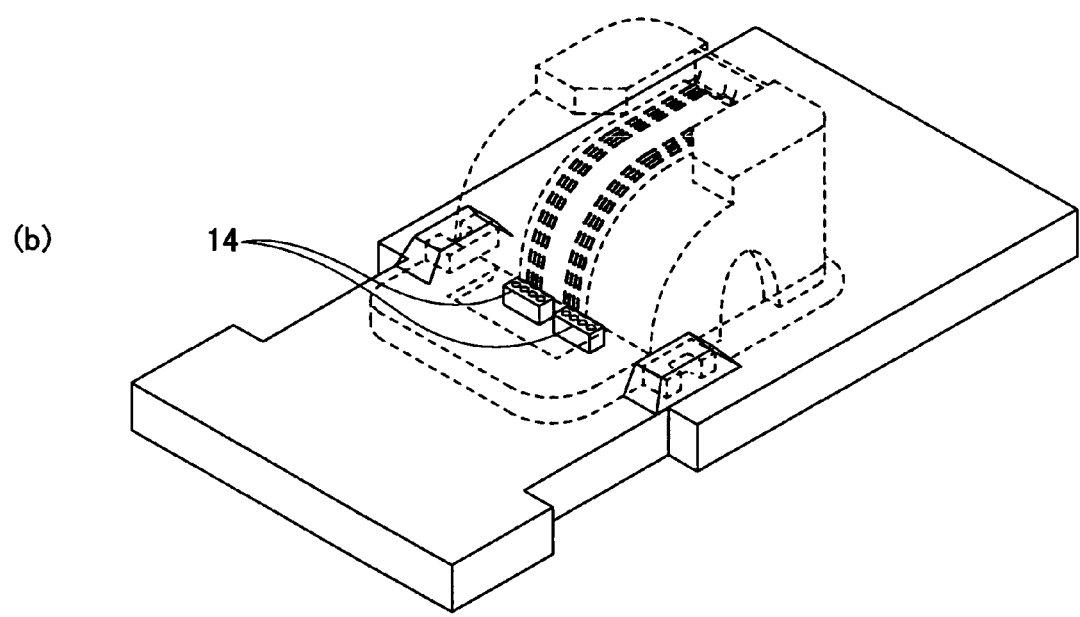

Referring to the drawings, an embodiment of the present invention is described.

FIG. 1 is a perspective view of a part of an optical transceiver using an optical waveguide holding member according to the embodiment of the present invention. In FIG. 1(a), the perspective view of a part of the optical transceiver is shown, and in FIG. 1(b), a part of FIG. 1(a) is drawn transparently.

As shown in FIG. 1(a), an optical transceiver 10 includes an optical waveguide holding member 12 mounted on a printed circuit board 11. The optical waveguide holding member 12 is adhered onto the printed circuit board 11 at adhering sections 13A and 13B.

The printed circuit board 11 is formed of glass epoxy resin on which copper wirings (not shown) are formed. As shown in FIG. 1(b), photoelectric conversion element blocks 14 are disposed in the printed circuit board 11. Photoelectric conversion elements in the photoelectric conversion element blocks 14 are connected to an external circuit (not shown) via copper wirings (not shown) and a connector (not shown). Each of the photoelectric conversion element blocks 14 includes, for example, four photoelectric conversion elements.

In FIG. 1, elements of the reference numbers 12B, 12C, 12D, 12E, and 15 are described below.

Figure 2:
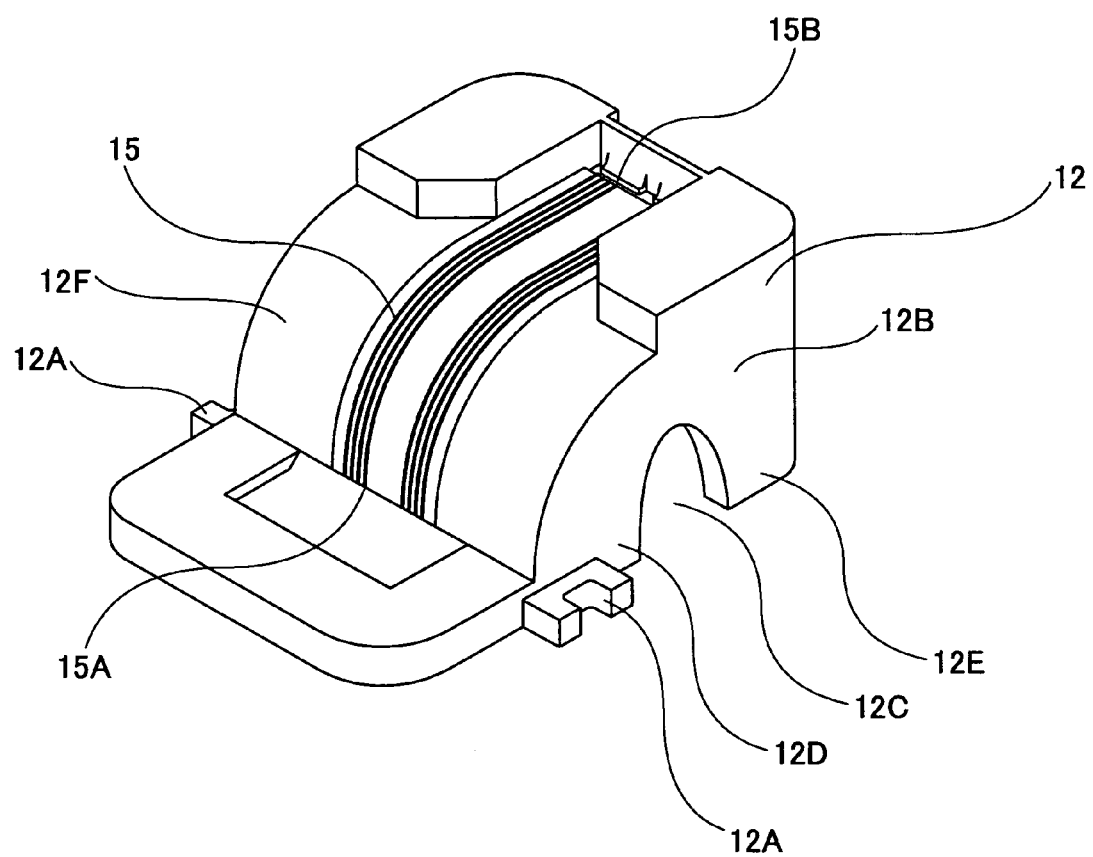
FIG. 2 is a perspective view of the optical waveguide holding member shown in FIG. 1.

FIG. 2 is a perspective view of the optical waveguide holding member 12. The optical waveguide holding member 12 is formed of olefin based resin having a function of cladding material, and includes a pair of flanges 12A. The flanges 12A are disposed at corresponding lower parts of the side walls 12B of the optical waveguide holding member 12, and are approximately U-shaped taken from the upper side. Notches 12C are formed at corresponding center lower parts of the side walls 12B. By the notch 12C, side wall lower parts 12D and 12E are formed in the corresponding side walls 12B. The flanges 12A are disposed at corresponding side wall lower parts 12D.

The optical waveguide holding member 12 has an upper surface 12F curved approximately 90°. In addition, for example, eight core members 15, which become corresponding cores for optical fibers, are formed at the center part on the upper surface 12F. As described above, the optical waveguide holding member 12 is formed of the olefin based resin having the function of the cladding material. After the core members 15 are formed, a cladding material layer (not shown) is formed on the core members 15. With this, the optical fibers whose cores are the core members 15 are formed on the upper surface 12F of the optical waveguide holding member 12. That is, the optical waveguide is formed of the core members 15 including the ends 15A (first ends), and the other ends 15B (second ends) formed on the upper surface 12F of the optical waveguide holding member 12, and the cladding material layer.

Each of the first ends 15A of the core members 15 is optically connected to the corresponding photoelectric conversion element of the photoelectric conversion element blocks 14 (refer to FIG. 1), and each of the second ends 15B of the core members 15 is optically connected to an external optical fiber (not shown). The optical waveguide holding member 12 includes element side lenses 16 (refer to FIG. 3A) formed at the corresponding first ends 15A of the core members 15, and fiber side lenses 17 (refer to FIG. 4) formed at the corresponding second ends 15B of the core members 15.

Figure 3A:
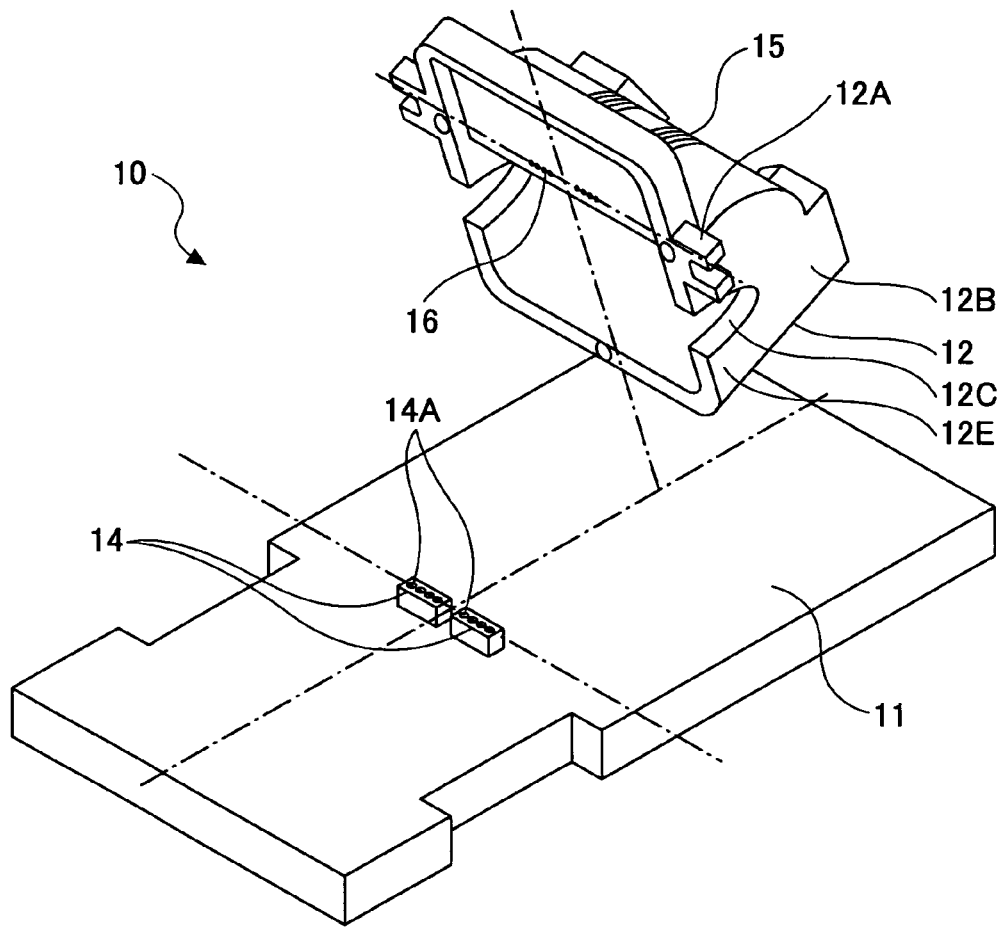
FIG. 3A is a perspective view of a part of the optical transceiver before adhering the optical waveguide holding member onto a printed circuit board shown in FIG. 1.
Figure 3B:
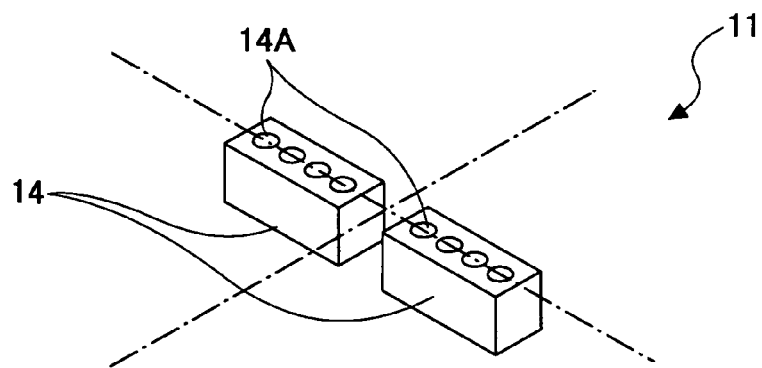
FIG. 3B is an enlarged perspective view of photoelectric conversion element blocks shown in FIG. 3A.

FIG. 3A is a perspective view of a part of the optical transceiver 10 before adhering the optical waveguide holding member 12 onto the printed circuit board 11. FIG. 3B is an enlarged perspective view of the photoelectric conversion element blocks 14. In FIG. 3B, light receiving and emitting sections 14A of the photoelectric conversion elements in the photoelectric conversion element blocks 14 are shown. In FIG. 3A, when the optical waveguide holding member 12 is adhered onto the printed circuit board 11, the element side lenses 16 face the corresponding light receiving and emitting sections 14A.

As shown in FIG. 3A, the optical waveguide holding member 12 includes the element side lenses 16 integrally formed with the optical waveguide holding member 12 at the first ends 15A of the core members 15. The diameter of the element side lens 16 is approximately 0.2 mm. The element side lens 16 optically connects the light receiving and emitting section 14A of the photoelectric conversion element of the photoelectric conversion element block 14 to the core member 15 when the optical waveguide holding member 12 is adhered onto the printed circuit board 11. A gap of approximately 500 μm exists between the first end 15A of the core member 15 and the light receiving and emitting section 14A of the photoelectric conversion element; however, an optical signal output from the first end 15A is condensed by the element side lens 16 so that the condensed optical signal is input to the light receiving and emitting section 14A of the photoelectric conversion element, and an optical signal output from the light receiving and emitting section 14A of the photoelectric conversion element is condensed by the element side lens 16 so that the condensed optical signal is input to the first end 15A.

As shown in FIG. 3B, the photoelectric conversion element blocks 14 are formed in the printed circuit board 11. In FIGS. 3A and 3B, the photoelectric conversion element blocks 14 protrude from the upper surface of the printed circuit board 11; however, actually, the level of the surfaces of the light receiving and emitting sections 14A of the photoelectric conversion elements in the photoelectric conversion element blocks 14 is almost the same as the level of the upper surface of the printed circuit board 11.

In the above description, the light receiving and emitting sections 14A are used. However, specifically, in FIG. 3B, in a pair of the photoelectric conversion element blocks 14, one of the photoelectric conversion element blocks 14 receives optical signals and converts the received optical signals into electric signals; that is, light receiving sections are formed by one of the photoelectric conversion element blocks 14. In addition, the other of the photoelectric conversion element blocks 14 converts electric signals into optical signals and outputs the optical signals; that is, light emitting sections are formed by the other of the photoelectric conversion element blocks 14. However, the present embodiment does not distinguish the light receiving sections from the light emitting sections, and both sections are referred to as the light receiving and emitting sections 14A.

In the above description, a first connecting section for optically connecting the first ends 15A to the light receiving and emitting sections 14A is formed.

Figure 4:
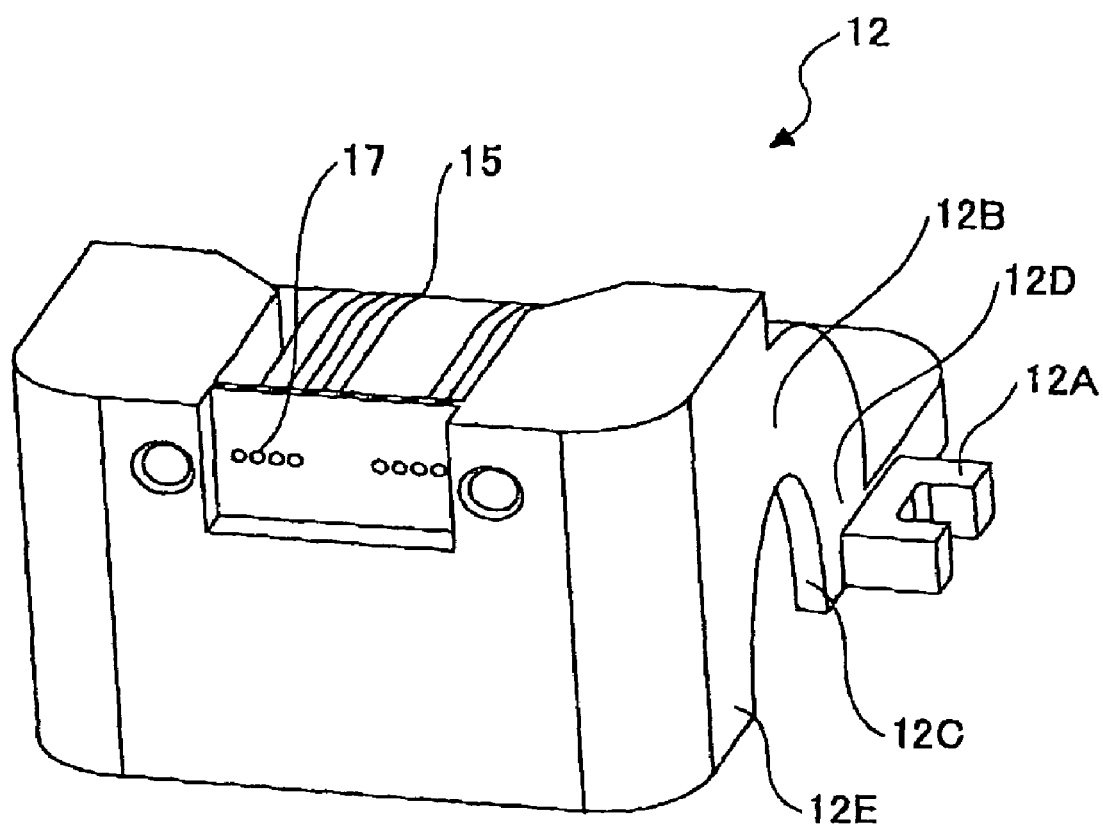
FIG. 4 is a perspective view of the optical waveguide holding member taken from the back side of the optical waveguide holding member before being mounted on the printed circuit board shown in FIG. 3A.

FIG. 4 is a perspective view of the optical waveguide holding member 12 taken from the back side of the optical waveguide holding member 12 before being mounted on the printed circuit board 11.

As shown in FIG. 4, the optical waveguide holding member 12 includes the fiber side lenses 17 integrally formed with the optical waveguide holding member 12 at the side of the second ends 15B of the core members 15. The diameter of the fiber side lens 17 is approximately 0.2 mm. The fiber side lens 17 optically connects the core member 15 to the external optical fiber. A gap of approximately 500 μm exists between the second end 15B of the core member 15 and the external optical fiber; however, an optical signal output from the second end 15B is condensed by the fiber side lens 17 and the condensed optical signal is input to the external optical fiber. In addition, an optical signal from the external optical fiber is condensed by the fiber side lens 17 and the condensed optical signal is input to the second end 15B of the core member 15.

In the above description, a second connecting section for optically connecting the second ends 15B to the external optical fibers is formed.

Figure 5:
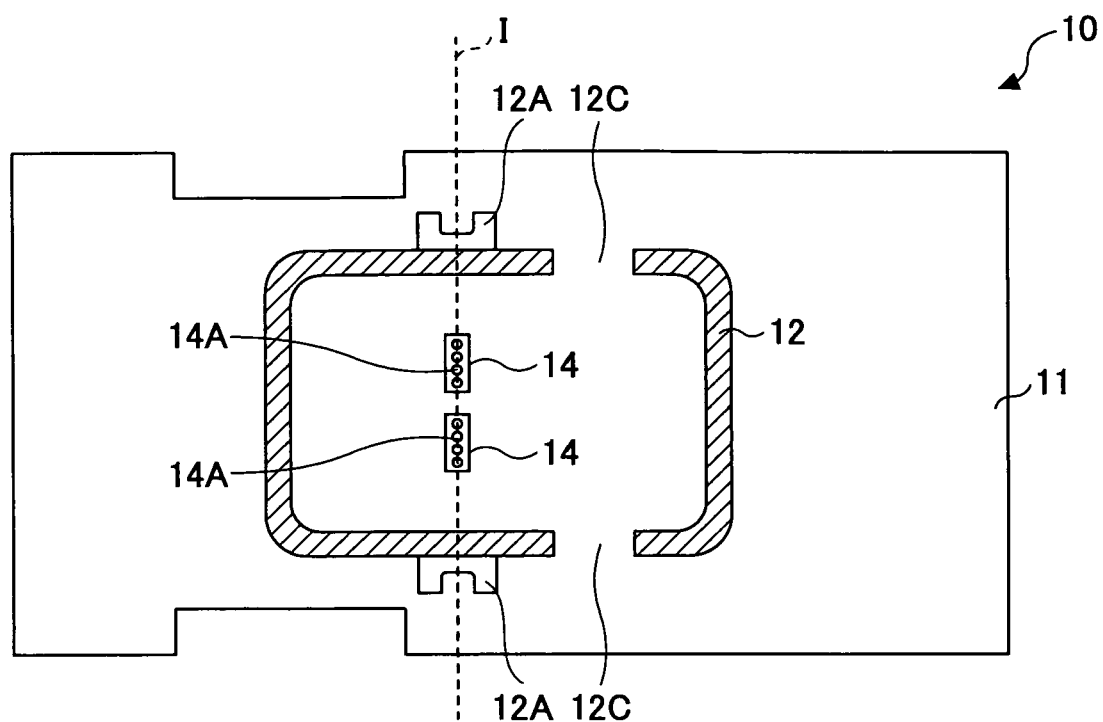
FIG. 5 is a plan view showing a positional relationship among the elements in the optical transceiver shown in FIG. 1.

FIG. 5 is a plan view showing a positional relationship among the elements in the optical transceiver 10. In FIG. 5, as the elements, only the printed circuit board 11, the optical waveguide holding member 12, the flanges 12A, the notches 12C, the photoelectric conversion element blocks 14, the light receiving and emitting sections 14A are shown. In addition, in FIG. 5, a cut-away plan view of the optical waveguide holding member 12 is shown.

As shown in FIG. 5, in the optical transceiver 10, the centers of the flanges 12A in the long length direction (Y) and the centers of the light receiving and emitting sections 14A of the photoelectric conversion element blocks 14 are arrayed on the same straight line I. In addition, the flanges 12A and the light receiving and emitting sections 14A are symmetrically disposed in the upper and lower directions in FIG. 5. As described above, specifically, one of the pair of the photoelectric conversion element blocks 14 receives optical signals, converts the received optical signals into electric signals, and outputs the electric signals, and the other of the pair of the photoelectric conversion element blocks 14 converts electric signals into optical signals and outputs the optical signals.

The centers of the flanges 12A in the long length direction are fixed centers of the flanges 12A when the optical waveguide holding member 12 is adhered onto the printed circuit board 11.

The light receiving and emitting sections 14A are optical centers of channels of the photoelectric conversion element blocks 14. Each of the photoelectric conversion element blocks 14 has, for example, four channels (four elements).

In FIGS. 1(a) and 2, when the optical waveguide holding member 12 is adhered onto the printed circuit board 11, the adhering sections 13A are formed by applying adhesive onto the flanges 12A and the side wall lower parts 12D, and the adhering sections 13B are formed by applying adhesive onto the bottom surface at the back side of the optical waveguide holding member 12 and the side wall lower parts 12E. The adhesive is not applied onto the bottom of the optical waveguide holding member 12 at the front side.

As described above, in the optical transceiver 10, the fixed centers of the pair of the flanges 12A in the long length direction and the optical centers of the light receiving and emitting sections 14A are arrayed on the same straight line I. Therefore, even if the temperature of the optical transceiver 10 rises to, for example, 80 to 90° C. and the optical waveguide holding member 12 and the printed circuit board 11 whose thermal expansion coefficients are different are expanded by the temperature, the positional shift between the optical centers of the light receiving and emitting sections 14A and the optical centers of the element side lenses 16 at the first ends 15A of the core members 15 can be restricted.

In addition, as described above, the adhesive is not applied onto the bottom of the optical waveguide holding member 12 at the front side. Therefore, when the temperature rises, stress which is applied to the flanges 12A from the side wall lower parts 12E and the bottom surface at the back side of the optical waveguide holding member 12 can be decreased. Consequently, the above positional shift can be restricted while sufficiently obtaining the adhesive strength between the optical waveguide holding member 12 and the printed circuit board 11.

Next, results of an experiment of the optical waveguide holding member 12 and the optical transceiver 10 are described.

In the experiment, the thermal expansion coefficient of the glass epoxy resin of the printed circuit board 11 is $1.3 \times 10^{-6}/°C$. In addition, the thermal expansion coefficient of the olefin based resin of the optical waveguide holding member 12 is $7.0 \times 10^{-6}/°C$.

In a conventional optical transceiver, the positional matching between the fixed centers and the optical centers is not executed, and the distance between the position (fixed center) adhering an optical waveguide holding member onto a printed circuit board and the optical centers of light receiving and emitting sections is 10 mm to some 10 mm. Even if the above distance is 10 mm and the optical centers between the light receiving and emitting sections and the optical waveguide are the same at room temperature (25° C.), when the temperature rises to 85° C., the distance between the fixed center of the printed circuit board and the optical centers of the light receiving and emitting sections becomes 10.007 mm, and the distance between the fixed center of the optical waveguide holding member and the optical centers of the light receiving and emitting sections becomes 10.0038 mm. Consequently, a positional shift between the optical centers becomes approximately 31 μm. Since the positional matching between the optical centers must be in a range of ± some μm, the performance of the conventional optical transceiver may be degraded.

Figure 6:
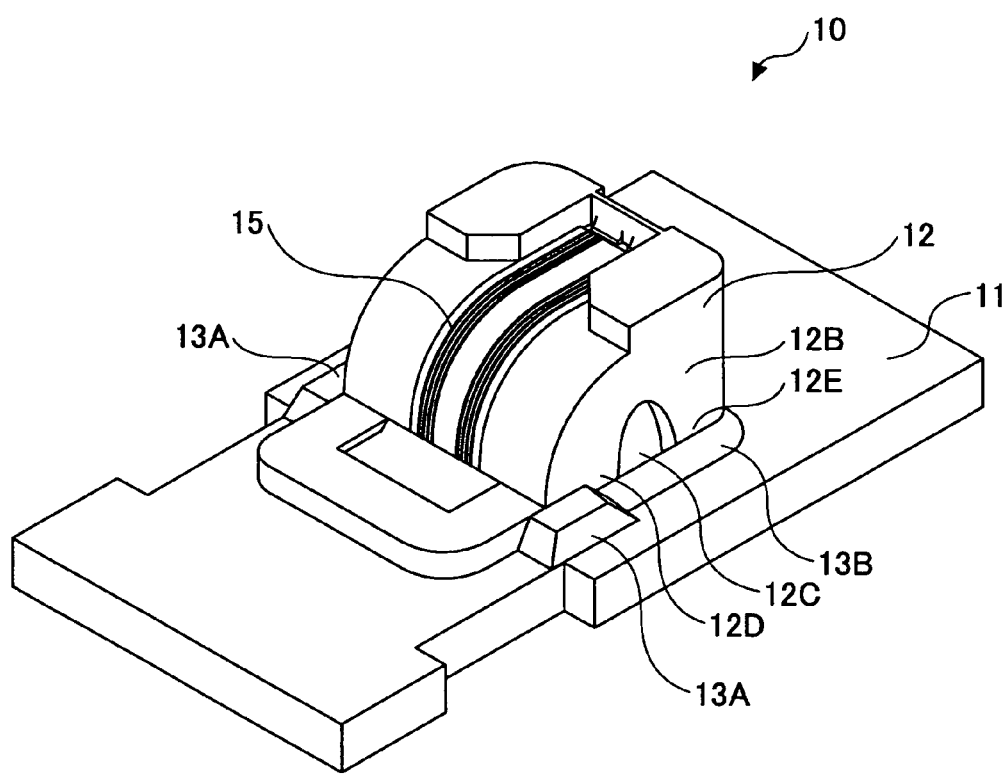
FIG. 6 is a perspective view of the optical transceiver for describing results of an experiment according to the embodiment of the present invention.

FIG. 6 is a perspective view of the optical transceiver 10 for describing the results of the experiment. In FIG. 6, coordinates are shown.

The results of the experiment are shown in Tables 1 and 2. In Table 1, the results of the experiment of the optical transceiver 10 including the optical waveguide holding member 12 in the present embodiment are shown, and in Table 2, the results of the experiment of the conventional optical transceiver including the conventional optical waveguide holding member are shown.

TABLE 1

| | | VALUES μm AT 85° C. | | | |
| --- | --- | --- | --- | --- | --- |
| | | OPTICAL CENTER 1 | OPTICAL CENTER 2 | OPTICAL CENTER 3 | OPTICAL CENTER 4 |
| SHIFTED AMOUNT "a" OF LIGHT RECEIVING AND EMITTING SECTIONS | X AXIS DIRECTION | −1.0 | −1.1 | −1.3 | −1.4 |
| | Y AXIS DIRECTION | −17.9 | −17.9 | −17.9 | −17.9 |
| SHIFTED AMOUNT "b" OF ELEMENT SIDE LENS | X AXIS DIRECTION | −0.5 | −0.7 | −0.8 | −1.1 |
| | Y AXIS DIRECTION | −19.3 | −19.3 | −19.2 | −19.0 |
| SHIFTED AMOUNT "a − b" OF OPTICAL POSITION | X AXIS DIRECTION | −0.5 | −0.4 | −0.5 | −0.3 |
| | Y AXIS DIRECTION | 1.4 | 1.4 | 1.3 | 1.1 |

TABLE 2

| | | VALUES μm AT 85° C. | | | |
| --- | --- | --- | --- | --- | --- |
| | | OPTICAL CENTER 1 | OPTICAL CENTER 2 | OPTICAL CENTER 3 | OPTICAL CENTER 4 |
| SHIFTED AMOUNT "a" OF LIGHT RECEIVING AND EMITTING SECTIONS | X AXIS DIRECTION | −0.9 | −1.1 | −1.2 | −1.4 |
| | Y AXIS DIRECTION | −16.5 | −16.4 | −16.4 | −16.4 |
| SHIFTED AMOUNT "b" OF ELEMENT SIDE LENS | X AXIS DIRECTION | −1.4 | −1.9 | −2.4 | −2.3 |
| | Y AXIS DIRECTION | −6.9 | −7.1 | −7.5 | −7.9 |
| SHIFTED AMOUNT "a − b" OF OPTICAL POSITION | X AXIS DIRECTION | 0.5 | 0.8 | 1.2 | 0.9 |
| | Y AXIS DIRECTION | −9.6 | −9.3 | −8.9 | −8.5 |

In FIG. 6, coordinates of XYZ axes are shown. The X axis direction is the direction of the straight line I shown in FIG. 5 (the width direction of the optical transceiver 10), the Y axis direction is the length direction of the optical transceiver 10, and the Z axis direction is the height direction of the optical transceiver 10.

The distance between the light receiving and emitting section 14A and the element side lens 16 in the Z axis direction (the height direction) can be adjusted by the curvature of the element side lens 16. Therefore, the shifted amounts in the X and Y axes directions are used to evaluate the optical transceivers.

In Tables 1 and 2, the shifted amounts "a", "b", and "a−b" are amounts when the temperature is changed from 25° C. to 85° C., and the shifted amounts are shown in μm. The shifted amount "a−b" of the optical position is the difference between the shifted amount of the light receiving and emitting section and the element side lens.

In addition, in Tables 1 and 2, the optical centers 1 through 4 are corresponding optical centers of the four light receiving and emitting sections in the photoelectric conversion element block for emitting optical signals, from the inner side to the outer side in order in the X axis direction (refer to FIG. 5).

Next, referring to Tables 1 and 2, the shifted amounts in the optical transceiver 10 including the optical waveguide holding member 12 according to the present embodiment are compared with the shifted amounts in the conventional optical transceiver including the conventional optical waveguide holding member.

[X Axis Direction]

As shown in Table 2, in the X axis direction of the conventional optical transceiver, the shifted amount "a−b" of the optical position between the light receiving and emitting section and the element side lens is 0.5 to 1.2 μm. In addition, as shown in Table 1, in the X axis direction in the optical transceiver 10 according to the present embodiment, the shifted amount "a−b" of the optical position between the light receiving and emitting section 14A and the element side lens 16 is −0.5 to −0.3 μm. Therefore, the shifted amount "a−b" in the present embodiment is smaller than that of the conventional optical transceiver. The tolerance of the shifted amount in the X axis direction (the direction of the straight line I) is ± some μm. In the optical transceiver 10 according to the present embodiment, the shifted amount "a−b" is decreased compared with that of the conventional optical transceiver.

[Y Axis Direction]

As shown in Table 2, in the Y axis direction of the conventional optical transceiver, the shifted amount "a−b" of the optical position between the light receiving and emitting section and the element side lens is −8.5 to −9.6 μm. In addition, as shown in Table 1, in the Y axis direction in the optical transceiver 10 according to the present embodiment, the shifted amount "a−b" of the optical position between the light receiving and emitting section 14A and the element side lens 16 is 1.1 to 1.4 μm. Therefore, the shifted amount "a−b" in the present embodiment is smaller than that of the conventional optical transceiver. The tolerance of the shifted amount in the Y axis direction is also ± some μm. In the conventional optical transceiver, the shifted amount "a−b" exceeds the tolerance; however, in the optical transceiver 10 according to the present embodiment, the shifted amount "a−b" is within the tolerance.

In addition, the notches 12C are evaluated. In this, specific values based on the evaluation are not shown; however, when the notches 12C are formed, stress at the back side of the optical waveguide holding member 12 is decreased and the shifted amount is lowered.

As described above, in the evaluated results of the experiment, in the optical transceiver 10 including the optical waveguide holding member 12, the fixed centers of the pair of the flanges 12A and the optical centers of the light receiving and emitting sections 14A are arrayed on the same straight line I. With this, the positional shift between the light receiving and emitting sections 14A and the element side lenses 16 due to a temperature change can be restrained. Especially, in the optical transceiver 10 according to the present embodiment, the shifted amount in the Y axis direction (the long length direction) can be greatly lowered compared with that in the conventional optical transceiver. Therefore, according to the embodiment of the present invention, the optical transceiver 10 including the optical waveguide holding member 12, in which a performance fluctuation caused by a temperature change is greatly lowered, can be realized.

In the embodiment of the present invention, the fixed centers of the pair of the flanges 12A and the optical centers of the light receiving and emitting sections 14A are arrayed on the same straight line I. However, the thermal expansion coefficients of the materials of the printed circuit board 11 and the optical waveguide holding member 12 are different. Consequently, as described above, the positional shift between the light receiving and emitting sections 14A and the element side lenses 16 occurs due to a temperature change. The optical transceiver 10 including the optical waveguide holding member 12 is used in an environment where the temperature changes. Therefore, it is possible that a positional shift between the fixed centers of the pair of the flanges 12A and the optical centers of the light receiving and emitting sections 14A be determined to be zero at a predetermined temperature. The predetermined temperature can be room temperature (25° C.) or an average temperature at a place where the optical transceiver 10 is used.

In the embodiment of the present invention, the photoelectric conversion element blocks 14 are formed in the printed circuit board 11. However, it is possible that the photoelectric conversion element blocks 14 be formed separately from the printed circuit board 11 and the photoelectric conversion element blocks 14 be mounted on the printed circuit board 11.

In addition, in the embodiment of the present invention, the optical waveguide is formed by disposing the cladding material layer and the core members 15 on the upper surface 12F of the optical waveguide holding member 12. However, the optical waveguide can be formed by disposing optical fibers on the upper surface 12F of the optical waveguide holding member 12 between the external optical fibers and the photoelectric conversion element blocks 14.

In addition, in the embodiment of the present invention, the notches 12C are formed in the corresponding side walls 12B of the optical waveguide holding member 12. However, the positional shift between the light receiving and emitting sections 14A and the element side lenses 16 may be restrained without having the notches 12C.

Further, the present invention is not limited to the specifically disclosed embodiment, and variations and modifications may be made without departing from the scope of the present invention.

The present application is based on Japanese Priority Patent Application No. 2007-182315 filed on Jul. 11, 2007, with the Japanese Patent Office, the entire contents of which are hereby incorporated herein by reference.

What is claimed is:

1. An optical waveguide holding member to be mounted on a printed circuit board of an optical transceiver that receives an optical signal from an external device and converts the received optical signal into an electric signal and transmits another optical signal to the external device by converting another electric signal into the other optical signal, which optical waveguide holding member holds an optical waveguide between external optical fibers and photoelectric conversion elements formed in or mounted on the printed circuit board, comprising:

a pair of flanges which is used to mount the optical waveguide holding member on the printed circuit board;

a first connecting section which optically connects first ends of the optical waveguide to corresponding light receiving and emitting sections of the photoelectric conversion elements; and a second connecting section which optically connects second ends of the optical waveguide to the corresponding external optical fibers; wherein optical centers of the first connecting section and fixed centers of the flanges are arrayed on a same straight line;

the photoelectric conversion elements are disposed in two blocks so that one of the blocks is used for receiving the optical signal and the other block is used for emitting the optical signal, and each of the blocks has plural photoelectric conversion elements for forming plural channels for the optical signals;

the flanges are symmetrically disposed on corresponding side walls of the optical waveguide holding member viewed from the upper side of the optical waveguide holding member; and the fixed centers of the flanges and optical centers of the light receiving and emitting sections of the photoelectric conversion elements of the two blocks are arrayed on the same straight line at the first connecting section.

2. The optical waveguide holding member as claimed in claim 1, wherein:

the light receiving and emitting sections of the photoelectric conversion elements of the two blocks are symmetrically formed in or mounted on the printed circuit board viewed from an upper side of the printed circuit board so that lenses at the first connecting section match the positions of the corresponding light receiving and emitting sections.

3. An optical waveguide holding member to be mounted on a printed circuit board of an optical transceiver that receives an optical signal from an external device and converts the received optical signal into an electric signal and transmits another optical signal to the external device by converting another electric signal into the other optical signal, which optical waveguide holding member holds an optical waveguide between external optical fibers and photoelectric conversion elements formed in or mounted on the printed circuit board, comprising:

a pair of flanges which is used to mount the optical waveguide holding member on the printed circuit board;

a first connecting section which optically connects first ends of the optical waveguide to corresponding light receiving and emitting sections of the photoelectric conversion elements; and a second connecting section which optically connects second ends of the optical waveguide to the corresponding external optical fibers; wherein optical centers of the first connecting section and fixed centers of the flanges are arrayed on a same straight line;

notches in side walls of the optical waveguide holding member; wherein the flanges are disposed at corresponding front sides of the side walls divided by the corresponding notches.

4. An optical transceiver which receives an optical signal from an external device and converts the received optical signal into an electric signal and transmits another optical signal to the external device by converting another electric signal into the other optical signal, comprising:

a printed circuit board; and an optical waveguide holding member to be mounted on the printed circuit board for holding an optical waveguide between external optical fibers and photoelectric conversion elements formed in or mounted on the printed circuit board; wherein the optical waveguide holding member includes a pair of flanges which is used to mount the optical waveguide holding member on the printed circuit board;

a first connecting section which optically connects first ends of the optical waveguide to corresponding light receiving and emitting sections of the photoelectric conversion elements; and a second connecting section which optically connects second ends of the optical waveguide to the corresponding external optical fibers; and optical centers of the first connecting section and fixed centers of the flanges are arrayed on a same straight line; and the photoelectric conversion elements are disposed in two blocks so that one of the blocks is used for receiving the optical signal and the other block is used for emitting the other optical signal, and each of the blocks has plural photoelectric conversion elements for forming plural channels for the optical signal;

the flanges are symmetrically disposed on corresponding side walls of the optical waveguide holding member viewed from the upper side of the optical waveguide holding member; and the fixed centers of the flanges and optical centers of the light receiving and emitting sections of the photoelectric conversion elements of the two blocks are arrayed on the same straight line at the first connecting section.

5. The optical transceiver as claimed in claim 4, wherein:

the light receiving and emitting sections of the photoelectric conversion elements of the two blocks are symmetrically formed in or mounted on the printed circuit board viewed from an upper side of the printed circuit board so that lenses at the first connecting section match the positions of the corresponding light receiving and emitting sections.

6. The optical transceiver as claimed in claim 4, wherein:

the optical waveguide holding member further includes notches in side walls of the optical waveguide holding member; and the flanges are disposed at corresponding front sides of the side walls divided by the corresponding notches.

* * * * *